US009019908B2

United States Patent
Chan

(10) Patent No.: US 9,019,908 B2
(45) Date of Patent: Apr. 28, 2015

(54) APPARATUS AND METHOD FOR POWER ADJUSTMENT FOR LINK IMBALANCES

(75) Inventor: Chunchung Chan, Hong Kong (CN)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 13/307,190

(22) Filed: Nov. 30, 2011

(65) Prior Publication Data

US 2013/0136042 A1    May 30, 2013

(51) Int. Cl.
- *H04W 4/00* (2009.01)
- *H04W 52/08* (2009.01)
- *H04W 52/14* (2009.01)
- *H04W 52/20* (2009.01)
- *H04W 52/28* (2009.01)
- *H04W 52/32* (2009.01)
- *H04W 52/48* (2009.01)

(52) U.S. Cl.
CPC ............ *H04W 52/08* (2013.01); *H04W 52/146* (2013.01); *H04W 52/20* (2013.01); *H04W 52/286* (2013.01); *H04W 52/325* (2013.01); *H04W 52/48* (2013.01); *Y02B 60/50* (2013.01)

(58) Field of Classification Search
None
See application file for complete search history.

(56) References Cited

U.S. PATENT DOCUMENTS

| 2005/0277419 A1* | 12/2005 | Takano et al. ................. 455/442 |
| 2009/0196246 A1* | 8/2009 | Goto et al. .................... 370/329 |

FOREIGN PATENT DOCUMENTS

| EP | 1630991 A1 | 3/2006 |
| WO | 2008045471 A2 | 4/2008 |

OTHER PUBLICATIONS

WO 2008/045471 A2 Title: Method and Apparatus for sending feedback for a downlink shared service transmitted to a plurality of wireless transmit/receive units. Inventor: Reznik et al. Filing Date: Oct. 10, 2007. Priority Date: Oct. 10, 2006.*
International Search Report and Written Opinion—PCT/US2012/067471—ISA/EPO—Jan. 30, 2013.

* cited by examiner

*Primary Examiner* — Andrew Lai
*Assistant Examiner* — Leon Andrews
(74) *Attorney, Agent, or Firm* — Darren M. Simon

(57) ABSTRACT

Methods and devices for dynamically controlling a transmission power of an HS-DPCCH are disclosed. A wireless user equipment receives downlink transmissions on a data channel from a serving cell, and determines a rate of duplicate packets on the data channel. The UE interprets a high rate of duplicate transmissions as an indication that the HS-DPCCH is not being successfully decoded, and therefore increases the transmission power of the HS-DPCCH. Correspondingly, the UE interprets a low rate of duplicate transmissions as an indication that the HS-DPCCH may have too high a transmission power, and therefore decreases the transmission power of the HS-DPCCH.

20 Claims, 10 Drawing Sheets

APPARATUS AND METHOD FOR POWER ADJUSTMENT FOR LINK IMBALANCES

BACKGROUND

1. Field

Aspects of the present disclosure relate generally to wireless communication systems, and at least some aspects pertain more particularly to power consumption reduction in user equipment in wireless communications systems through power adjustment of communication channels.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

One such advancement in conventional systems has been the introduction of closed-loop control for downlink transmissions. In these systems, a mobile station receives certain data and control information on downlink transmissions, and transmits one or more uplink channels including feedback signaling relating to the received downlink transmissions. In this type of system, decisions relating to adjustments of the downlink transmissions may be made in accordance with the feedback transmitted on the uplink. These adjustments can include the downlink transmission power, modulation, and encoding, among others, and may further include decisions whether to retransmit downlink data if the feedback indicates that a packet was not decoded properly at the mobile station.

In these systems, the reliability of the uplink transmission including the feedback information can affect downlink performance. That is, if the feedback is incorrectly received or not received at all, then improper adjustments to the downlink may cause problems with downlink performance. For this reason, there is a desire to utilize uplink feedback transmissions in a way that best improves reliability.

However, the transmission of the feedback information on uplink channels consumes some of the resources available to the mobile station for uplink data transmissions. For this reason, there is a countervailing desire to utilize uplink transmissions in a way that is most efficient and consumes the least amount of resources.

As a result, there is a desire to achieve the most effective balance between reliability and efficiency for uplink transmissions of feedback information even in time-varying channel conditions, particularly in a way that accounts for soft handovers and other incidents that might otherwise affect the wireless link.

SUMMARY

Methods and apparatuses are described herein for facilitating dynamic power offset adjustments for uplink transmissions by a user equipment on a channel used in reporting channel feedback. The dynamic power offset adjustments can be based on power setting of other channels used by the user equipment and adjusted in response to monitoring of data transmissions on a data channel used by the user equipment.

For example, in one aspect, the disclosure provides a method of wireless communication operable at a user equipment. The method includes steps such as determining a power for transmitting an uplink response channel in accordance with a rate of duplicate packets received on a downlink data channel, and transmitting the uplink response channel utilizing the determined power.

Another aspect of the disclosure provides a user equipment configured for wireless communication. Here, the user equipment includes at least one processor, a memory coupled to the at least one processor, a transmitter coupled to the at least one processor for transmitting an uplink response channel and an uplink control channel, and a receiver coupled to the at least one processor for receiving a downlink data channel. Further, the at least one processor is configured to determine a power for transmitting the uplink response channel in accordance with a rate of duplicate packets received on the downlink data channel, and to transmit the uplink response channel utilizing the determined power.

Another aspect of the disclosure provides a computer program product operable at a user equipment configured for wireless communication. Here, the computer program product includes a computer readable medium having instructions for causing a computer to determine a power for transmitting an uplink response channel in accordance with a rate of duplicate packets received on a downlink data channel, and instructions for causing a computer to transmit the uplink response channel utilizing the determined power.

Another aspect of the disclosure provides a user equipment configured for wireless communication. Here, the user equipment includes means for determining a power for transmitting an uplink response channel in accordance with a rate of duplicate packets received on a downlink data channel, and means for transmitting the uplink response channel utilizing the determined power.

These and other aspects of the invention will become more fully understood upon a review of the detailed description, which follows.

DRAWINGS

FIG. 1 is a conceptual diagram illustrating an example of an access network.

FIG. 2, a block diagram illustrating select components of a telecommunications system.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Methods and apparatuses are described herein for facilitating dynamic power offset adjustments for a response channel transmitted by a user equipment and used in reporting channel feedback related to data transmissions on a data channel. The dynamic power offset adjustments can be based on power setting of other channels used by the user equipment and adjusted in response to monitoring of data transmissions on the data channel used by the user equipment.

The discussions herein may concentrate on High Speed Packet Access (HSPA) 3GPP standards for Universal Mobile Telecommunications System (UMTS) and 3rd Generation Partnership Project (3GPP) systems as one example in order to provide a high level of detail of some aspects of the present disclosure. However, those of ordinary skill in the art will recognize that aspects of the present disclosure may be used and included in many other wireless communication protocols and systems.

Figure 1:
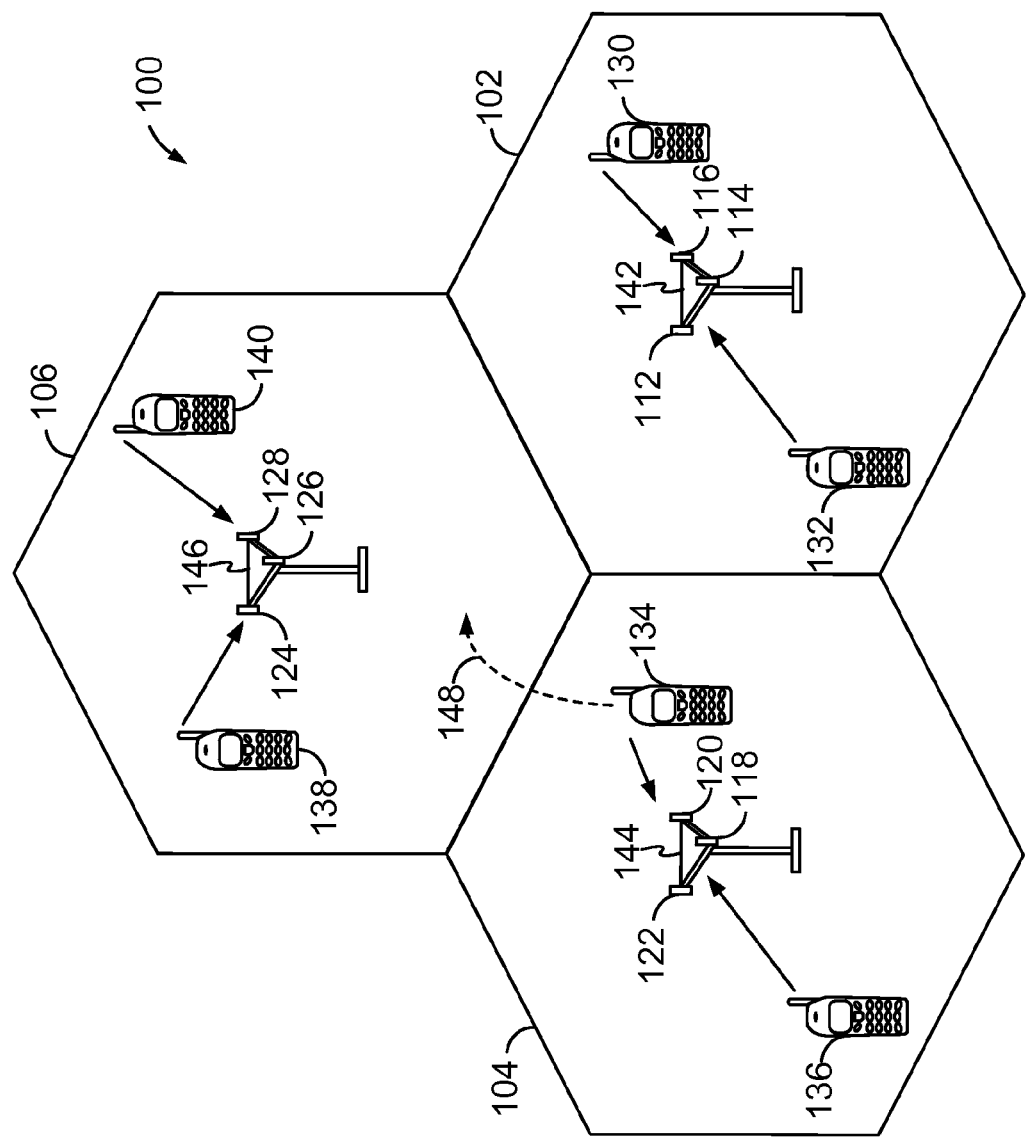

FIG. 1 is a conceptual diagram illustrating an example of an access network 100. As a non-limiting example, a simplified access network 100 in a Universal Mobile Telecommunications System (UMTS) Terrestrial Radio Access Network (UTRAN) architecture, which may utilize 3GPP high-speed packet access (HSPA), is illustrated. The access network 100 includes multiple cellular regions (cells), including cells 102, 104, and 106, each of which may include one or more sectors. While the illustration generally shows what are typically referred to as macro-cells, various aspects of the present disclosure may equally apply to heterogeneous networks wherein at least one of the cells is utilized as a low-power node, such as a pico-cell or femto-cell.

In a cell that is divided into sectors, the multiple sectors within a cell can be formed by groups of antennas with each antenna responsible for communication with one or more user equipment (UE) in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104, and 106 may include several UEs that may be in communication with one or more sectors of each cell 102, 104 or 106. For example, UEs 130 and 132 may be in communication with a base station, commonly referred to as a Node B 142, of cell 102, UEs 134 and 136 may be in communication with the Node B 144 of cell 104, and UEs 138 and 140 may be in communication with the Node B 146 of cell 106. Here, each Node B 142, 144, 146 is configured to provide an access point to a core network 204 (see FIG. 2) for all the UEs 130, 132, 134, 136, 138, 140 in the respective cells 102, 104, and 106.

Some types of UEs may be mobile devices. As a result, a UE may migrate from one cell to another cell. As a non-limiting example, the UE 134 may migrate 148 from the cell 104 to the cell 106 while it is communicating within the access network 100. In order for the UE 134 to maintain uninterrupted communication, a handover, which may be a soft handover, may be performed to switch data communication between the UE 134 and the Node B 144 to data communication between the UE 134 and the Node B 146. Additional details related to movement between cells and power control are discussed below.

Figure 2:
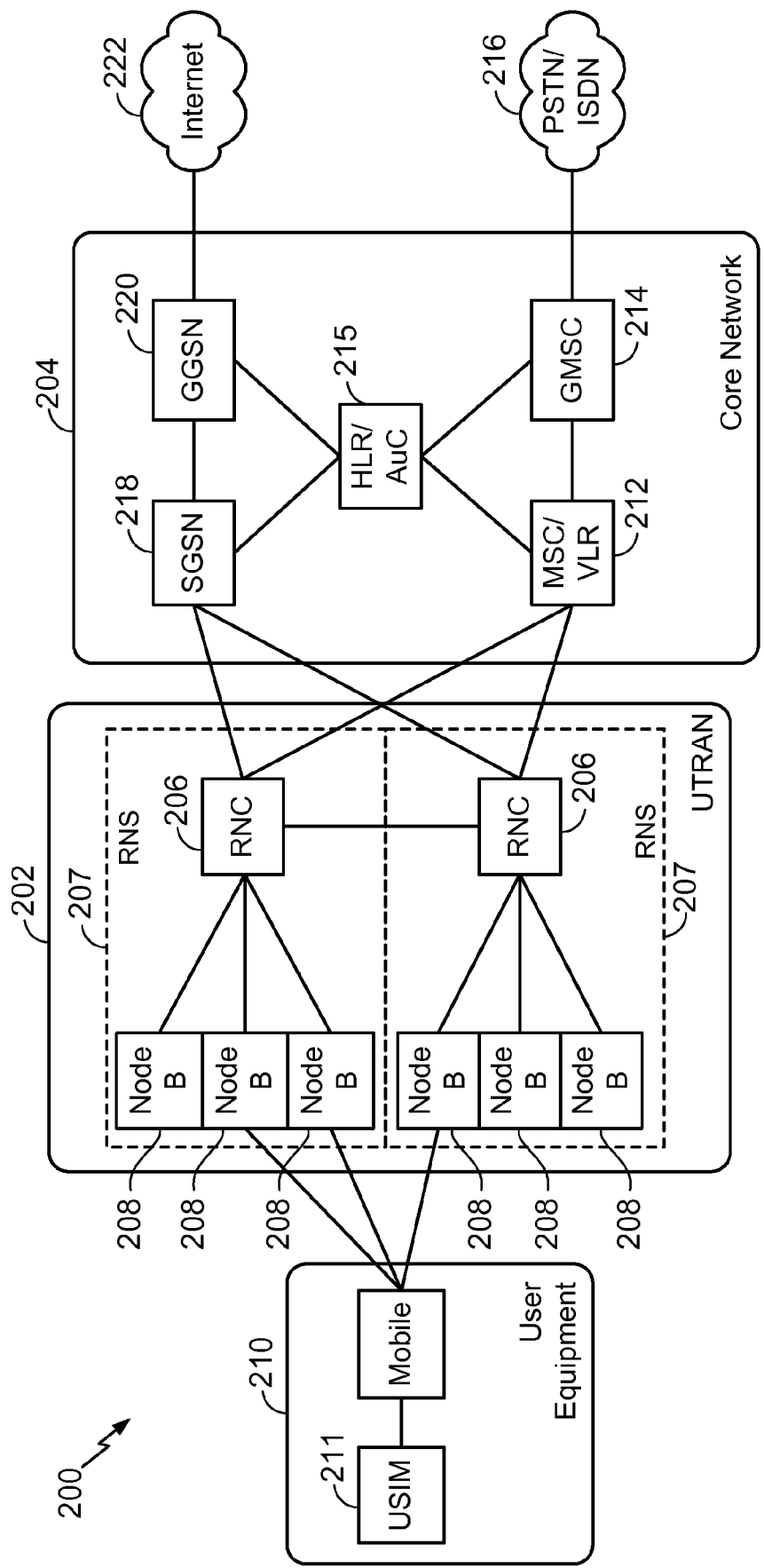

Referring now to FIG. 2, by way of example and without limitation, various aspects of the present disclosure are illustrated with reference to a Universal Mobile Telecommunications System (UMTS) system 200 including an access network (such as the access network 100 of FIG. 1) employing a W-CDMA air interface. A UMTS network generally includes three interacting domains for which there may be multiple instances of some of the domains. The domains may include: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207, which may vary from the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For example, the base stations 142, 144, and 146 illustrated in FIG. 1 may be examples of a Node B 208.

For clarity, three Node Bs 208 are shown in each RNS 207. However, the RNSs 207 may include any number of wireless Node Bs. The Node Bs 208 provide wireless access points to a core network (CN) 204 for any number of UEs 210.

A UE 210 may be a mobile apparatus. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) 210 in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 may also include a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Figure 3:
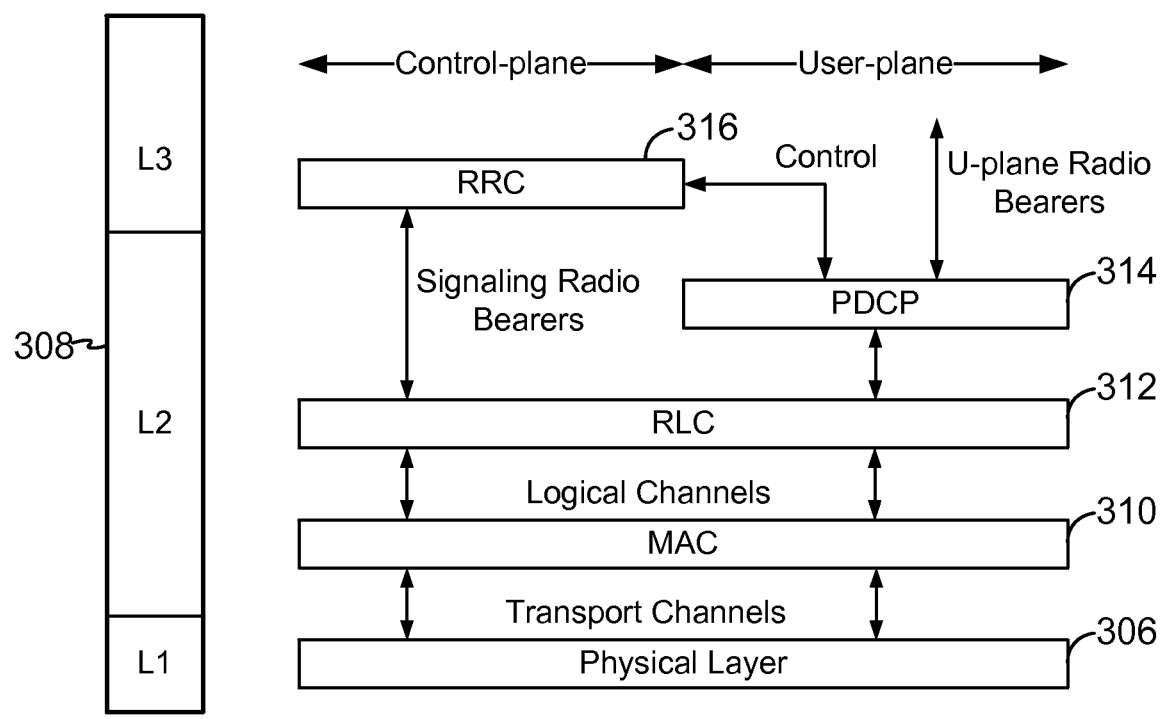
FIG. 3 is a block diagram illustrating an example of a radio protocol architecture for user and control planes between the user equipment and the Node B of FIG. 2.

FIG. 3 is a block diagram illustrating an example of a radio protocol architecture for user and control planes between the UE 210 and the Node B 208 of FIG. 2. In FIG. 3, the user plane or data plane carries user traffic, while the control plane carries control information, i.e., signaling.

With reference to FIGS. 2 and 3, the radio protocol architecture for the UE 210 and Node B 208 is shown with three layers: Layer 1 (L1), Layer 2 (L2), and Layer 3 (L3). Layer 1 is the lowest layer and implements various physical layer signal processing functions. Layer 1 may be referred to herein as the physical layer 306. The data link layer, called Layer 2 (or "the L2 layer") 308 is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcast and paging functions, establishing and configuring radio bearers, etc.

In the illustrated air interface, the L2 layer 308 is split into sublayers. In the control plane, the L2 layer 308 includes two sublayers: a Medium Access Control (MAC) sublayer 310 and a Radio Link Control (RLC) sublayer 312. In the user plane, the L2 layer 308 additionally includes a Packet Data Convergence Protocol (PDCP) sublayer 314. Although not shown, the architecture may include several upper layers above the L2 layer 308 including a network layer (e.g., Internet Protocol (IP) layer) that is terminated at a Packet Data Network (PDN) gateway on the network side, and an application layer that is terminated at the other end of the connection (e.g., far end UE, server, etc.).

The PDCP sublayer 314 exists in the user plane, and provides functions including header compression for upper layer data packets to reduce radio transmission overhead, user data transfer between the non-access stratum and the appropriate RLC entity, and handover support for UEs between Node Bs.

The RLC sublayer 312 generally supports acknowledged, unacknowledged, and transparent mode data transfers, and provides functions including segmentation and reassembly of upper layer data packets into or from RLC protocol data units (RLC PDUs), error correction by retransmission of lost data packets, flow control, ciphering, and reordering of data packets, e.g., to compensate for out-of-order reception due to a hybrid automatic repeat request (HARQ). The RLC sublayer 312 may communicate with one or more MAC entities 310 over logical channels The MAC sublayer 310 provides multiplexing between logical channels, from the RLC entity 312, and transport channels, from the physical layer 306. The MAC sublayer 310 is also responsible for allocating the various radio resources (e.g., resource blocks) in one cell among the UEs, as well as HARQ operations. The MAC sublayer 310 includes various MAC entities, including but not limited to a MAC-d entity and MAC-hs/ehs entity. In the present disclosure, a MAC entity may refer to any one or more of the various MAC entities included in the MAC sublayer 310. Upon completion of processing of downlink packets, the MAC sublayer 310 generally delivers the packets to the RLC entity 312.

Figure 4:
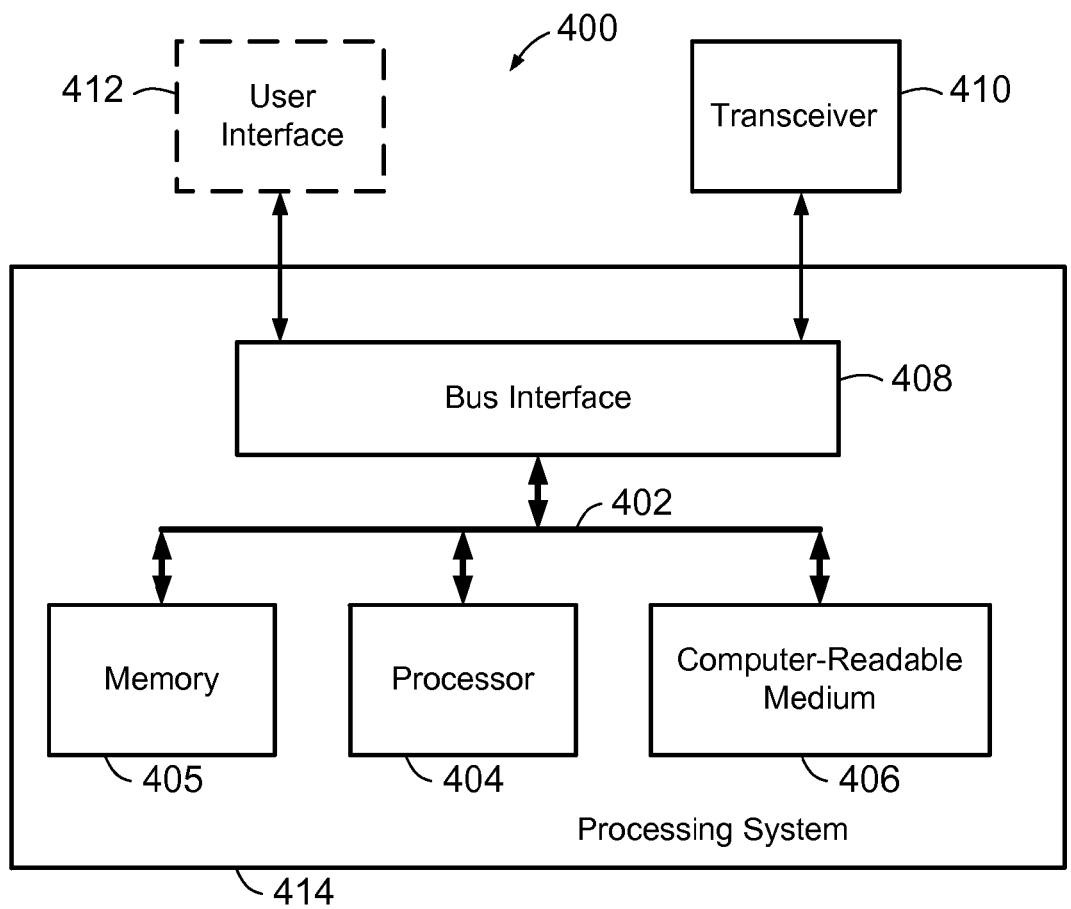
FIG. 4 is a block diagram illustrating an example of a hardware implementation for a user equipment employing a processing system.

Turning now to FIG. 4, a block diagram is provided to illustrate an example of a hardware implementation for an apparatus 400 employing a processing system 414. In accordance with various aspects of this disclosure, an element, or any portion of an element, or any combination of elements may be implemented with a "processing system" that includes one or more processors. For example, an apparatus 400 may be employed as a user equipment (such as UE 210 in FIG. 2). In the example illustrated in FIG. 4, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, a memory 405, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. For example, the transceiver 410 can be adapted to facilitate wireless communications with one or more other devices. In such cases, the transceiver 410 can include transmitter and/or receiver chains and one or more antennas. Depending upon the nature of the apparatus, a user interface 412 (e.g., keypad, display, speaker, microphone, joystick) may also be provided.

According to some aspects of the disclosure, the processor 404 may include one or more microprocessors, microcontrollers, digital signal processors (DSPs), field programmable gate arrays (FPGAs), programmable logic devices (PLDs), state machines, gated logic, discrete hardware circuits, and/or other suitable hardware configured to perform the various functionality described throughout this disclosure. The processor 404 is responsible for managing the bus 402 and general processing, including the execution of software stored on the computer-readable medium 406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 404, causes the processing system 414 to perform the various functions and/or process steps described herein for any particular apparatus. As such, when executing computing instructions, the processing system 414 is considered a special-purpose processing system.

The computer-readable medium 406 may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium 406 may also include, by way of example, a carrier wave, a transmission line, and any other suitable medium for transmitting software and/or instructions that may be accessed and read by a computer. The computer-readable medium 406 may be resident in the processing system 414, external to the processing system 414, or distributed across multiple entities including the processing system 414. The computer-readable medium 406 may be embodied in a computer program product. By way of example, a computer program product may include a computer-readable medium 406 in packaging materials. Those skilled in the art will recognize how best to implement the described functionality presented throughout this disclosure depending on the particular application and the overall design constraints imposed on the overall system.

The computer-readable medium 406 may also be used for storing data that is manipulated by the processor 404 when executing software. Thus, according to one or more aspects of the present disclosure, the processor 404 may be adapted to perform any or all of the processes, functions, steps and/or routines related to any of the UEs and/or Node Bs described herein. As used herein, the terms "adapted" and "configured" in relation to the processor 404 may refer to the processor 404 being one or more of configured, employed, implemented, or programmed to perform a particular process, function, step and/or routine according to various features described herein.

Figure 5:
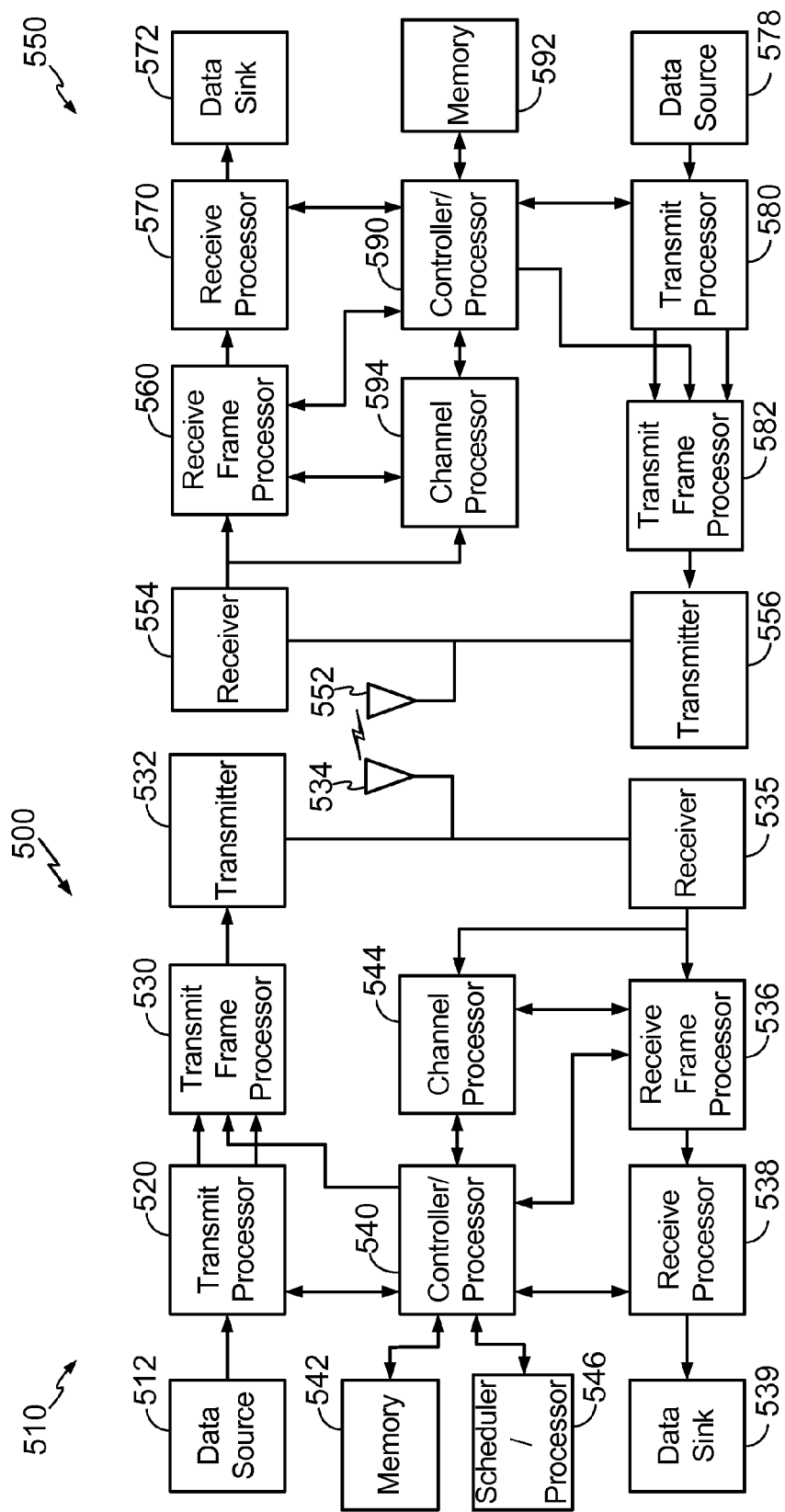
FIG. 5 is a block illustrating more detailed examples of two processing systems implemented as a Node B and a user equipment.

FIG. 5 is a block illustrating more detailed examples of two processing systems implemented as a Node B 510 and a UE 550. In the depicted example, the Node B 510 is in communication with the UE 550, where the Node B 510 may be the Node B 208 in FIG. 2, and the UE 550 may be the UE 210 in FIG. 2. In the downlink communication, a transmit processor 520 at the Node B 510 may receive data from a data source 512 (e.g., a backhaul interface) and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback (e.g., CQI values) from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. In a system supporting HSDPA, when the frames are successfully decoded by the receiver processor 570, the controller/processor 590 may use an acknowledgment (ACK), which may be transmitted on an HS-DPCCH, to confirm the successful status. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may use a negative acknowledgement (NACK) to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. In a system supporting HSUPA, when the frames are successfully decoded by the receiver processor 538, the controller/processor 540 may use an acknowledgment (ACK), which may be transmitted on an E-HICH, to confirm the successful status. The data and control signals carried by the successfully decoded frames may then be provided to a data sink 539 and the controller/processor, respectively. If some of the frames were unsuccessfully decoded by the receive processor, the controller/processor 540 may use a negative acknowledgement (NACK) to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
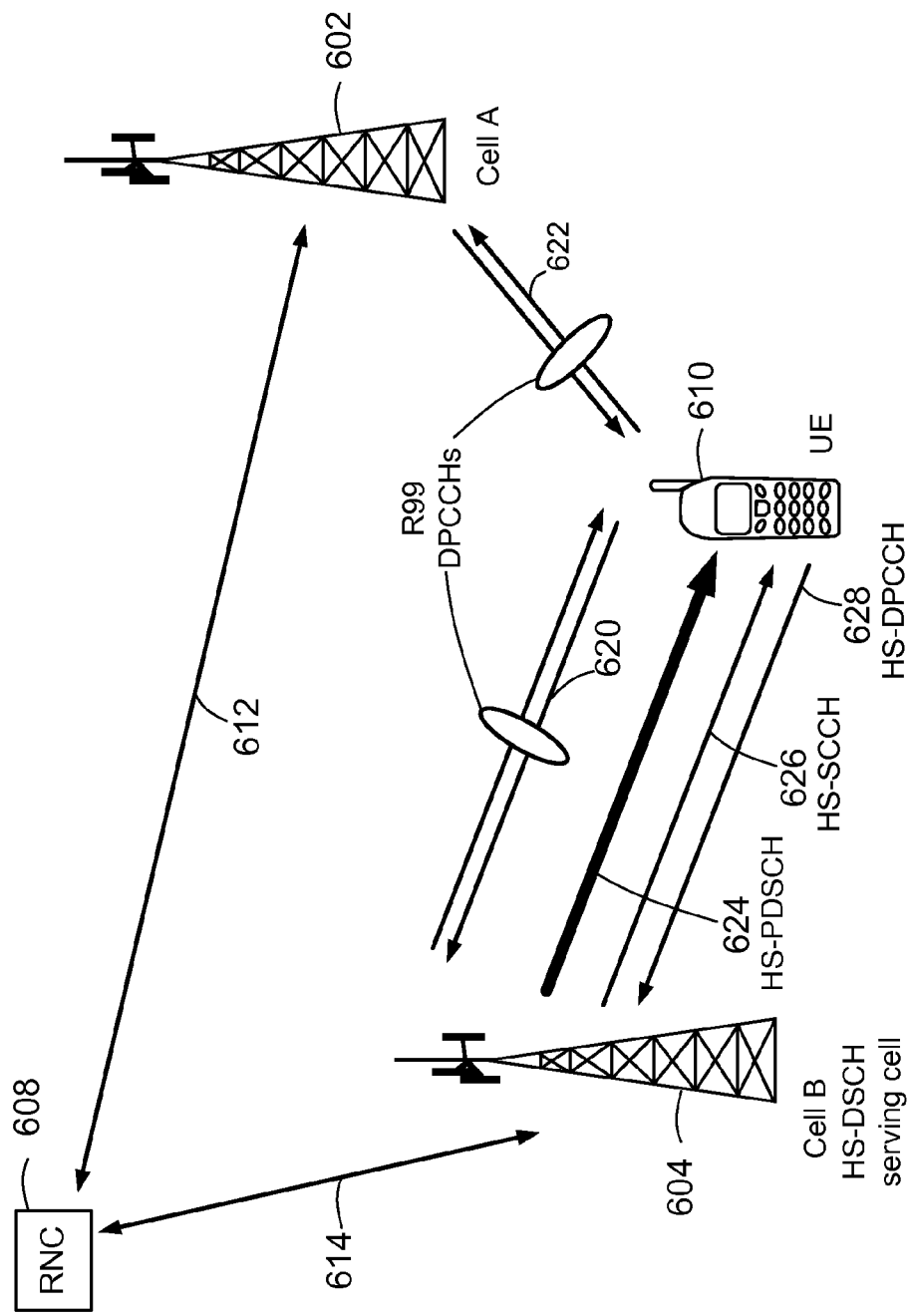
FIG. 6 is a conceptual diagram illustrating an example of an access network including various communication channels.

FIG. 6 is a conceptual diagram illustrating another example of an access network including additional detail pertaining to certain communication channels. That is, the access network illustrated in FIG. 6 may generally be the same as the access network illustrated in FIG. 1. Here, an RNC 608 may communicate with one or more Node Bs 602 and 604. For example, the RNC 608 may communicate with the Node B 602 over a backhaul communication channel 612 and with the Node B 604 over a backhaul communication channel 614. The RNC 608 may additionally communicate with any number of other Node Bs over respective backhaul communication channels (not shown). Here, the backhaul communication channels 612 and 614 may be implemented utilizing an Iub interface, known to those of ordinary skill in the art.

In accordance with various aspects of the present disclosure, the access network illustrated in FIG. 6 may be implemented utilizing an HSPA air interface. HSPA includes a series of enhancements to the 3G/W-CDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

An HSDPA network may utilize as its transport channel the high-speed downlink shared channel (HS-DSCH). The HS-DSCH is implemented by three physical channels: the high-speed physical downlink shared channel (HS-PDSCH) 624, the high-speed shared control channel (HS-SCCH) 626, and the high-speed dedicated physical control channel (HS-DPCCH) 628.

On the downlink, the HS-PDSCH 624 (also referred to herein as a data channel) carries data information (which may be at relatively high rates), and the HS-SCCH 626 carries control information so that the UE 610 knows how to decode the HS-PDSCH 624. The HS-DPCCH 628 carries feedback on uplink transmissions from the UE 610, and can be used dynamically to adapt the corresponding downlink transmissions, for example, when the channel conditions change. Specifically, the HS-DPCCH 628 carries HARQ ACKnowledgement (ACK) signaling, Negative ACKnowledgement (NACK) signaling to indicate whether a corresponding packet transmission received on a downlink transmission was decoded successfully. That is, the UE 610 provides feedback to the Node B 604 over the HS-DPCCH 628 to indicate whether it correctly decoded a packet on the HS-PDSCH 624 downlink. HS-DPCCH 628 further includes feedback signaling from the UE 610 to assist the Node B 604 in making a proper decision in terms of modulation and coding scheme and precoding weight selection. For example, this feedback signaling may include a Channel Quality Indicator (CQI) and Precoding Control Information (PCI).

The described channels (HS-PDSCH, HS-SCCH, and HS-DPCCH) in the HSDPA network are transmitted in addition to those corresponding to the release-99 dedicated channel (DCH). The DCH is a transport channel mapped to physical channels including the dedicated physical data channel (DPDCH), which carries information such as user data, and the dedicated physical control channel (DPCCH), which carries control information associated with the DPDCH. Each of the DPDCH and the DPCCH are utilized on both the uplink and the downlink. In the present disclosure, for simplicity's sake, the uplink DPCCH may generally be referred to as a control channel.

As illustrated in FIG. 6, the UE 610 may be in a soft handover. That is, the UE 610 may be located in an overlapping coverage area of two sectors belonging to different Node Bs 602 and 604, such that communications over the release-99 DCH, in particular, the uplink DPCCHs 620 and 622 and their respective corresponding downlink channels, may be in soft handover between the UE 610 and the respective Node Bs, such that communication over these channels takes place concurrently by way of the two air interface channels. This concurrent communication to Node Bs 602 and 604 may be used to coordinate features such as power control and synchronization.

However, with respect to the HSDPA channels 624, 626, and 628, soft handover functionality is not provided. That is, at any instance, in HSDPA, the UE 610 has only one serving cell, called the serving HS-DSCH cell. The serving HS-DSCH cell is generally the "best" downlink cell, determined in accordance with UE measurements of a pilot channel transmitted by each cell (e.g., the common pilot channel CPICH). As the UE 610 moves, or as downlink channel conditions change, the serving HS-DSCH cell may change in accordance with UE reports of the best CPICH. Here, the downlink HS-PDSCH 624 and HS-SCCH 626 are transmitted by the serving HS-DSCH cell 604, and the uplink HS-DPCCH 628 is received and decoded by the serving HS-DSCH cell 604.

In an HSDPA network, various issues may arise corresponding to the setting of the transmission power of the HS-DPCCH 628. For example, the HS-DPCCH utilizes a portion of the uplink transmission power, and therefore, setting the power too high can impact the link budget for other uplink transmissions from the UE. Similarly, setting the power too high can cause a potentially unnecessary noise rise, interfering with uplink transmissions from other UEs. On the other hand, setting the HS-DPCCH power too low can affect HSDPA performance if the transmissions are not properly received at the Node B.

For example, the Node B may unnecessarily retransmit data packets even though they were correctly received by the UE, when the feedback transmitted on the HS-DPCCH 628, including the HARQ ACK, is not properly received at the Node B. That is, even though the UE 610 received downlink data correctly and sent a positive acknowledgment, if the HS-DPCCH 628 power is too low, the positive acknowledgment may be missed by the Node B 602 and the packet may be retransmitted anyway. Further, if the serving HS-DSCH cell 602 fails to receive the CQI information from the UE 610, carried on the HS-DPCCH 628, the network may not be capable of scheduling the UE 610.

Despite the importance of properly managing the transmission power of the HS-DPCCH 628, as described above, a link imbalance between the uplink and downlink, particularly in a soft handover scenario, can nevertheless make setting the transmission power of the HS-DPCCH 628 problematic. These issues can additionally frequently arise in a heterogeneous network, in which low-power nodes such as a pico-cell or femto-cell are deployed in a geographic area at least partially covered by a high-power node, i.e., a macro-cell. Here, when a network includes a mix of high-power nodes and low-power nodes, uplink path losses cannot easily be compared utilizing the received downlink power levels. That is, the strongest downlink cell may not have the lowest uplink path loss. In another scenario, to address certain RF design issues such as pilot pollution, the CPICH transmit power of a particular Node B may be reduced. In these cases, differently powered cells may have significant differences in downlink and uplink losses, and such link imbalances may essentially be unavoidable.

That is, the serving HS-DSCH cell is chosen in accordance with downlink channel conditions, generally corresponding to the CPICH power received at the UE 610. However, due to the link imbalance conditions, the "best" downlink cell, which is generally selected to be the HS-DSCH serving cell, may not be the same cell that would best receive uplink transmissions from the UE 610, such as the HS-DPCCH 628. Additionally, release-99 power control, configured to address issues such as the near-far problem, remains in place in an HSDPA network. Here, this power control can adversely affect the transmission power setting of the HS-DPCCH 628. That is, the transmission power of the HS-DPCCH 628 is generally based at least in part on the transmission power of the DPCCH 620. Here, the transmission power of the DPCCH 620 may be controlled in accordance with factors unrelated to the HS-DPCCH 628, resulting in problematic reception of the HS-DPCCH 628.

For example, in a scenario where the UE 610 is in soft handover between the serving HS-DSCH cell 604 and a second cell 602, and the second cell 602 is the better cell on the uplink, the second cell 602 may send release-99 power control signaling to the UE 610 instructing it to reduce its transmission power on the DPCCH 620. Here, because the transmission power of the HS-DPCCH 628 is linked to the transmit power of the DPCCH 620, the transmission power of the HS-DPCCH 628 may also be reduced, potentially to such a level as to reduce its reliability at the serving HS-DSCH cell 604.

Thus, in summary, if a non-serving cell such as the cell 602 instructs the UE 610 to reduce the power level of the DPCCH, the transmission power of the HS-DPCCH may be reduced to an insufficient level to be properly decoded at the serving HS-DSCH cell 604. This link imbalance can accordingly result in misdetection of CQI and HARQ ACK/NACK signaling at the serving HS-DSCH cell 604, adversely impacting HSDPA performance.

The relationship between the transmission power of the HS-DPCCH 628 and that of the DPCCH 620 is generally defined in terms of an offset. Here, an offset may refer to a ratio between the respective transmission powers, or may refer to a linear addition (in a log scale) to the transmission power on the DPCCH 620.

Figure 7:
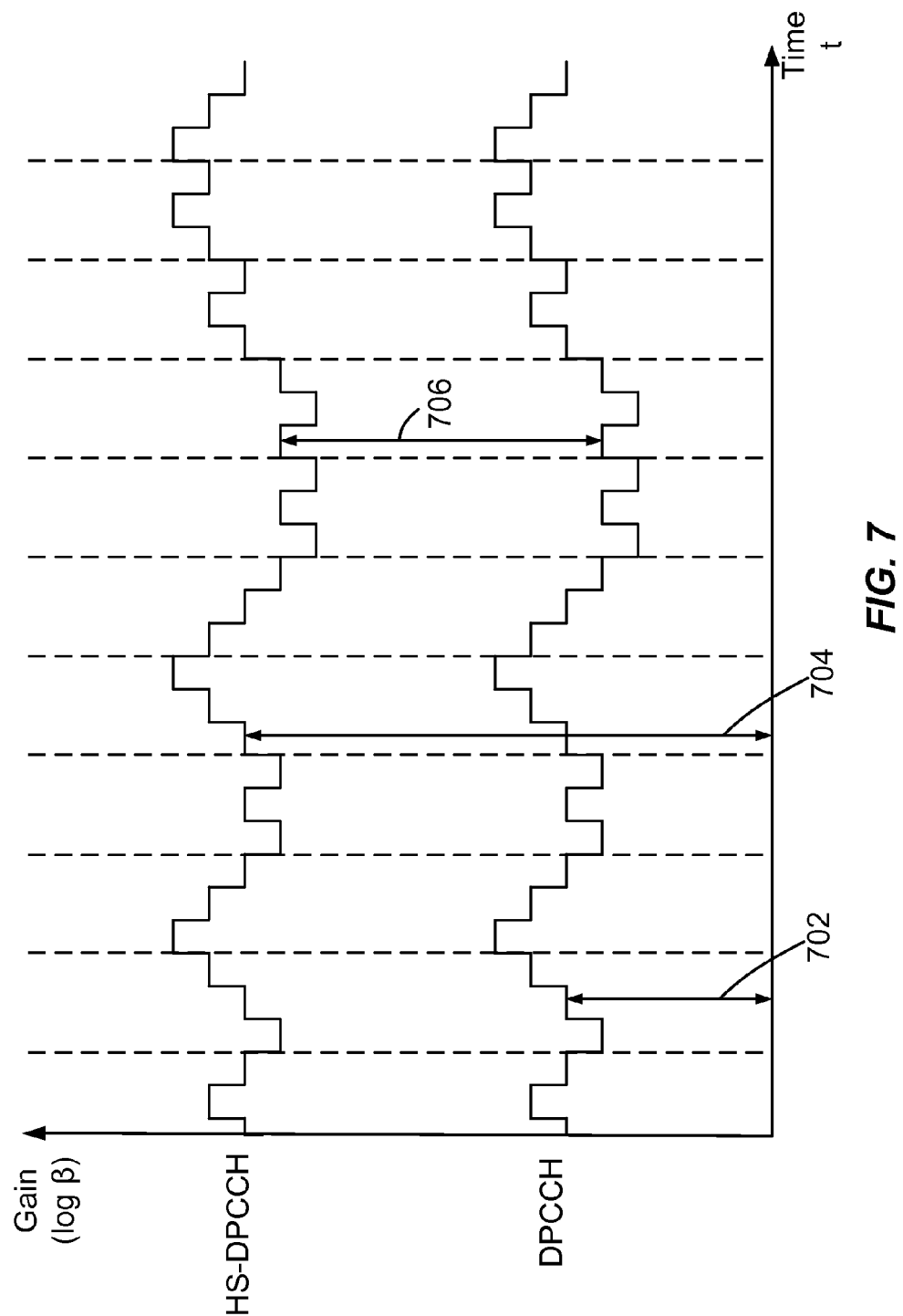
FIG. 7 is a timing diagram illustrating power levels for a control channel and a response channel.

For example, FIG. 7 is a chart illustrating one example of power levels for a control channel (DPCCH) 620 and a response channel (HS-DPCCH) 628. Specifically, the illustrated chart plots the gain β for the control channel DPCCH and the response channel HS-DPCCH, on a logarithmic scale, with respect to time. In the illustrated example, the transmission power, or the gain in the transmission power of the control channel DPCCH is adjusted over time, increasing and decreasing in accordance with various factors such as release-99 power control by the serving cell or other cells in a soft handover scenario. In various examples, the changes to the transmission power of the control channel DPCCH may be made per time slot. Here, as the transmission power of the control channel DPCCH changes, in accordance with a transmission power offset 706, the transmission power, or the gain in the transmission power of the response channel HS-DPCCH may also change.

The transmission power offset 706 may be defined according to a gain ratio $\beta_{hs}/\beta_c$. That is, the control channel DPCCH may utilize a first gain 702, designated as $\beta_c$. Further, the response channel HS-DPCCH may utilize a second gain 704, designated as $\beta_{hs}$. Here, the second gain 704 corresponding to the response channel HS-DPCCH may be determined in accordance with a transmission power offset 706 corresponding to the gain ratio $\beta_{hs}/\beta_c$. This transmission power offset 706 is typically controlled by the network, which sends Layer 3 radio resource control (RRC) signaling to the UE 610, this signaling including one or more information elements corresponding to the transmission power offset 706. Here, the received transmission power offset value may be used to set the power of the HS-DPCCH 628 based on an offset relative to the transmission power of the DPCCH 620.

On the response channel HS-DPCCH, different information may be carried in different time slots. That is, a typical HS-DPCCH transmission may last for a duration of three slots, where the first slot carries the HARQ ACK/NACK information for a corresponding data packet, and the second and third slots carry the downlink CQI to indicate information relating to the downlink channel quality.

Accordingly, the RRC signaling received at the UE 610 for controlling the transmission power offset 706 typically includes an offset corresponding to each information type carried on the HS-DPCCH. That is, the transmission power offset 706 may include one or more of a CQI power offset DeltaCQI, a HARQ ACK power offset DeltaACK, and a HARQ NACK power offset DeltaNACK.

Specifically, the CQI power offset DeltaCQI may indicate a power offset between a slot carrying CQI information on the response channel HS-DPCCH, and the associated control channel DPCCH. Further, the HARQ ACK power offset DeltaACK may indicate a power offset between a slot carrying HARQ ACK information on the response channel HS-DPCCH, and the associated control channel DPCCH. Still further, the HARQ NACK power offset DeltaNACK may indicate a power offset between a slot carrying HARQ NACK information on the response channel HS-DPCCH, and the associated control channel DPCCH. Here, each of the transmission power offset values DeltaCQI, DeltaACK, and DeltaNACK may be provided to the UE 610 by way of RRC signaling generated at the RNC 608.

An issue with this form of power control for the response channel HS-DPCCH is that the RRC signaling providing the transmission power offset 706 provides fixed, relatively inflexible power offset parameters. That is, because the RRC entity resides at the RNC 608, and signaling between the RNC 608 and the UE 610 can be slow and exhibit some delay, changes to the HS-DPCCH 628 power may therefore be relatively slow, and further, can undesirably consume downlink capacity when transmitted by the Node B. For these and other reasons, RRC signaling alone for controlling the power level of the response channel HS-DPCCH may be considered inadequate to address issues relating to a link imbalance as described above.

Aspects of the present disclosure address this link imbalance by enabling the UE 610 dynamically to adjust the transmission power offset of the HS-DPCCH response channel 628 relative to the DPCCH control channels 620. That is, in accordance with factors such as a duplicate transmission rate, discussed in further detail below, the transmission power offset may be controlled at the UE 610 to take a value different from the one set by the RRC signaling that provides power adjustment signals from the RNC 608.

Figure 8:
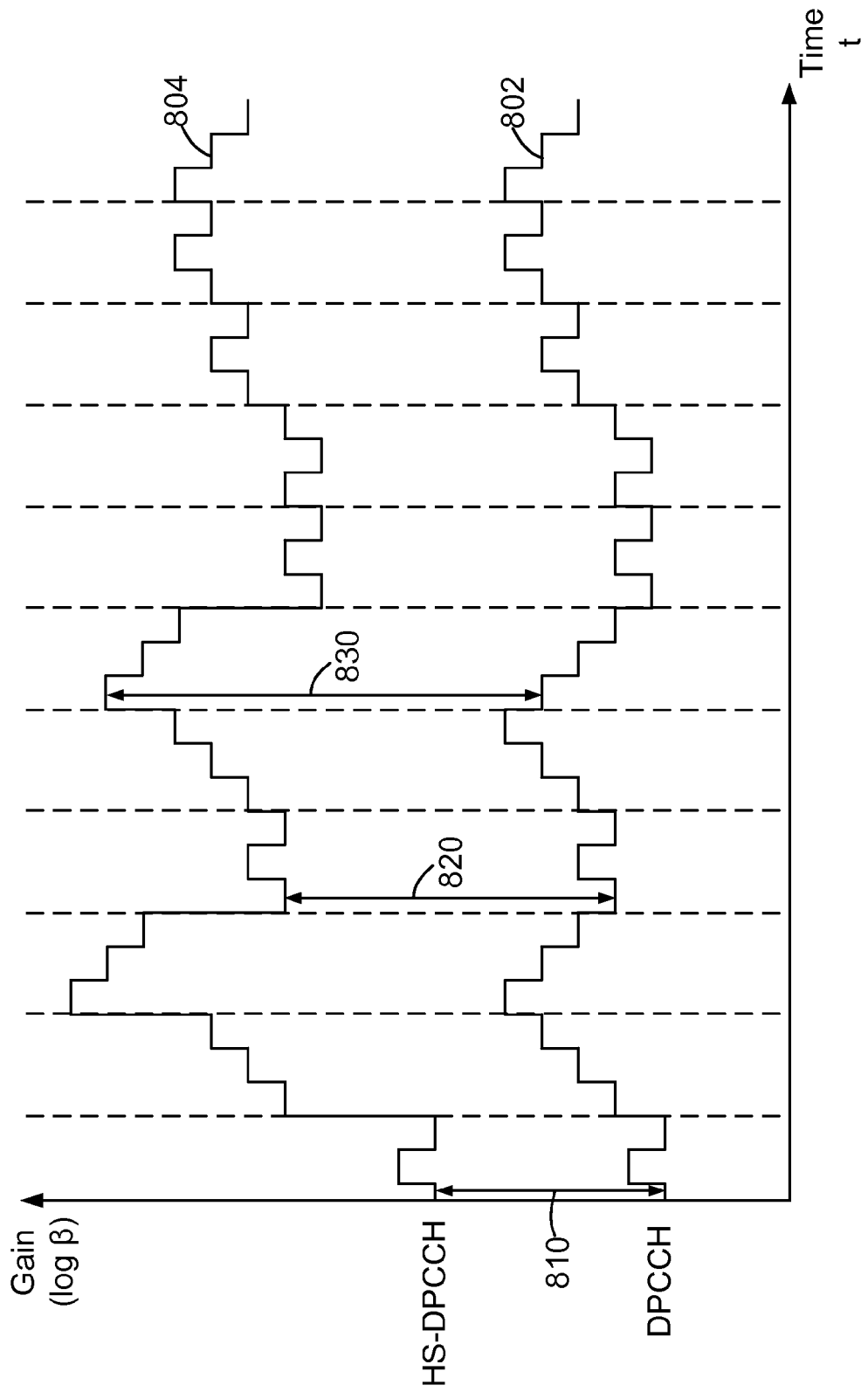
FIG. 8 is a timing diagram illustrating power levels for a control channel and a response channel, where the power of the response channel is dynamically adjusted by the user equipment.

FIG. 8 is a chart illustrating one example of power levels for a control channel 802, which may be the DPCCH 620, and a response channel 804, which may be the HS-DPCCH 628, using power adjustment features according to some of the aspects of the present disclosure. Similar to FIG. 7, the illustrated chart plots the gain β for the control channel 802 and the response channel 804, on a logarithmic scale, with respect to time. However, in FIG. 8, the transmission power offset, corresponding to the ratio between the gain used for the response channel 804 (e.g., HS-DPCCH) and the gain used for the control channel 802 (e.g., DPCCH), is not fixed for a relatively long period of time, only adjustable by means of RRC signaling, but may be dynamically adjusted over time by the UE 610. For example, a first gain ratio 810 may be relatively low, such that the gain for the response channel HS-DPCCH may be relatively close to that of the control channel DPCCH. A second gain ratio 820 may be a middle-valued gain ratio, while a third gain ratio 830 may be relatively high, such that the gain for the response channel HS-DPCCH may be substantially greater than that of the control channel DPCCH.

Figure 9:
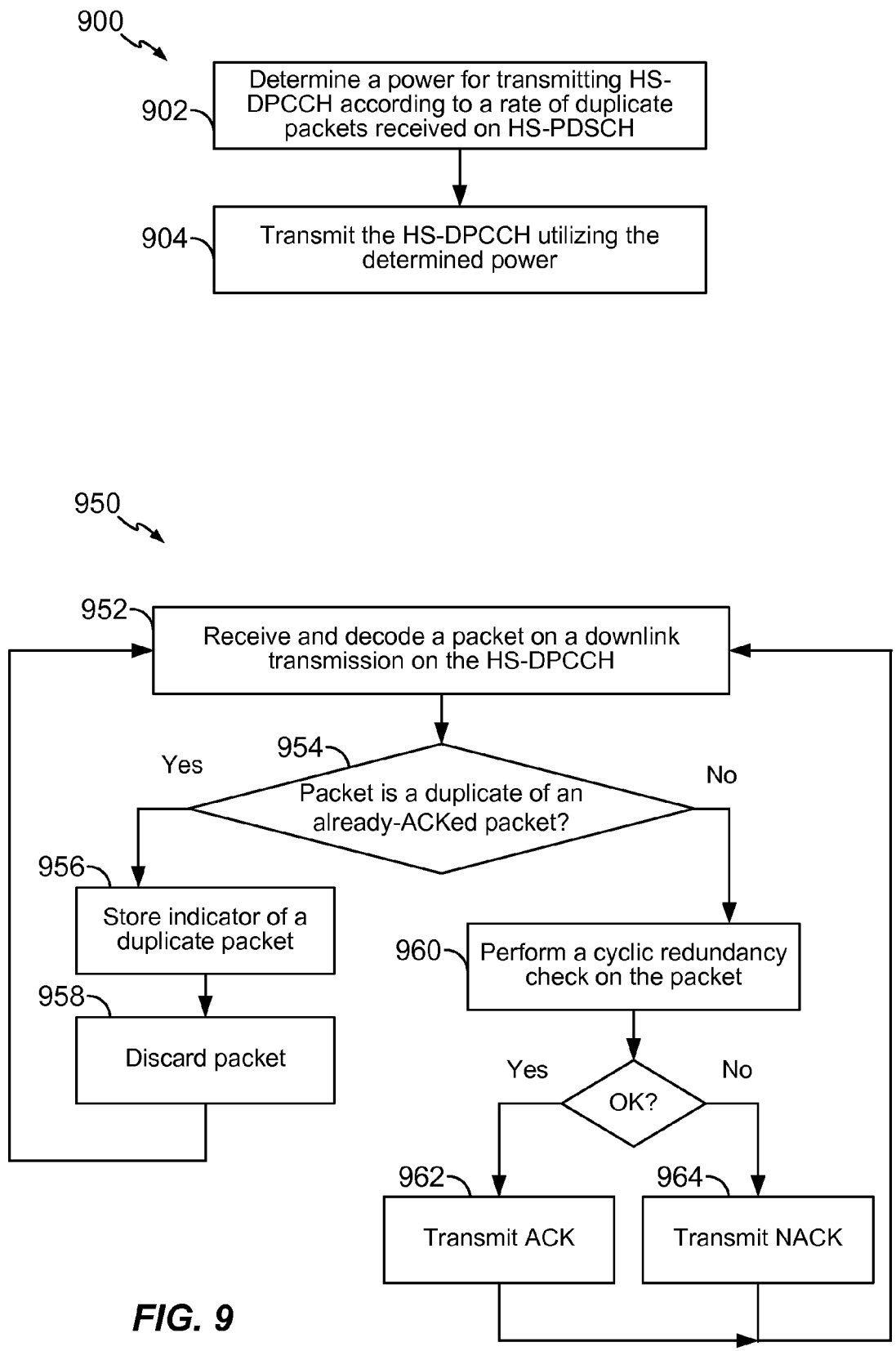
FIGS. 9 and 10 illustrate flow diagrams showing various processes for implementing dynamic power adjustment of a response channel.

For example, FIG. 9 illustrates a process 900 for dynamically adjusting the transmission power offset of the HS-DPCCH response channel. In some aspects of the disclosure, the process 900 may be performed by the UE 610 illustrated in FIG. 6. In some aspects of the disclosure, the process 900 may be performed by the UE 550 illustrated in FIG. 5, or by one or more sub-blocks of the UE 550 such as the controller/processor 590. In other examples, the process 900 may be performed by the processing system 414 illustrated in FIG. 4, or by any other suitable apparatus for performing the described functions.

In block 902, the UE determines a power for transmitting the uplink response channel (e.g., the HS-DPCCH) in accordance with a rate of duplicate packets received on a downlink data channel (e.g., the HS-PDSCH). Once the transmission power is determined, in block 904, the UE transmits the uplink response channel utilizing the determined power.

That is, in an aspect of the present disclosure, the UE 610 may measure a duplicate transmission rate, e.g., a number of duplicate packets transmitted by the Node B 604 on the HS-PDSCH 624 over a given time. As discussed above, if the HS-DPCCH 628, which carries the HARQ acknowledgment messages, is not properly received by the Node B 604 (considered by the Node B as a discontinuous transmission or DTX), or if the Node B 604 receives a NACK on the HS-DPCCH 628, the Node B 604 generally retransmits the corresponding packet on the HS-PDSCH 624. Here, when the UE 610 receives the retransmission, it may determine that the retransmitted packet corresponds to a duplicate transmission, and accordingly update the duplicate transmission rate. This duplicate transmission rate may correspond to an ACK to NACK/DTX rate, which may be measured in some conventional UEs according to UMTS standards.

Process 950 in FIG. 9 illustrates additional details of block 902 in accordance with some aspects of the present disclosure. That is, in block 952, the UE 610 may receive and decode a first packet on the downlink data channel, e.g., the HS-DPCCH. In block 954, the process may determine whether the packet is a duplicate of an already-ACKed packet. For example, if the first packet received in block 952 is a HARQ retransmission of an earlier packet, which the UE 610 previously received, properly decoded, and transmitted a HARQ acknowledgment message indicating a successful reception of the packet, then the first packet may be considered to be a duplicate packet. Here, if the first packet is not determined to be a duplicate, then in block 960 the UE 610 may perform a cyclic redundancy check (CRC) to test the integrity of the received packet. If the CRC passes, then in block 962 the UE 610 may transmit a positive acknowledgment (ACK) corresponding to the first packet. On the other hand, if the CRC fails, then in block 964 the UE 610 may transmit a negative acknowledgment (NACK) corresponding to the first packet. The process may then return to block 952 to receive and decode additional packets.

For the sake of a simple example, assume that the first packet received in block 952 passes the CRC in block 960 and a corresponding ACK is transmitted in block 962. Assuming here that a second packet is later received in block 952, and in block 954 the UE determines that the second packet is a retransmission of the first packet, the process may proceed to block 956. Here, the UE 610 may store in a memory an indicator of a duplicate packet corresponding to the determination that the second packet is a retransmission of the first packet. The UE 610 may then discard the packet in block 958, since the information contained therein has already been received and processed.

That is, in some aspects of the present disclosure, in a scenario where the UE 610 is transmitting a large number of NACKs, and therefore is requesting retransmissions, it might not necessarily be the case that an increased number of HARQ retransmissions on the HS-PDSCH indicates an insufficient power on the HS-DPCCH. In this case, the UE 610 can detect whether a duplicate transmission is an unnecessary retransmission, in accordance with the determination in block 954 that the UE 610 received and decoded an earlier transmission of that same packet, and accordingly transmitted the corresponding HARQ ACK. In this case, the UE 610 generally may discard the retransmitted data. Here, the UE 610 may utilize this knowledge that the retransmission was requested, and may correspondingly adjust the determined rate of duplicate transmissions utilized for the described adjustment to the power offset for the transmission power for the HS-DPCCH 628.

With this stored information relating to the duplicate packets, the UE 610 may accordingly determine the power, e.g., corresponding to a transmission power offset, for the HS-DPCCH in accordance with the rate of duplicate packets.

In general, according to some aspects of the present disclosure a higher rate of duplicate packets can imply that the transmission power for the HS-DPCCH 628 is too low, and the transmission power offset can accordingly be increased. On the other hand, a lower rate of duplicate packets can imply that the transmission power for the HS-DPCCH 628 is potentially too high, and the transmission power offset can accordingly be decreased.

In some aspects of the disclosure, the increasing or decreasing of the transmission power offset can be bounded by an upper bound and a lower bound. Here, RRC signaling may be utilized to set at least one or in some aspects both of the upper and lower bounds.

Figure 10:
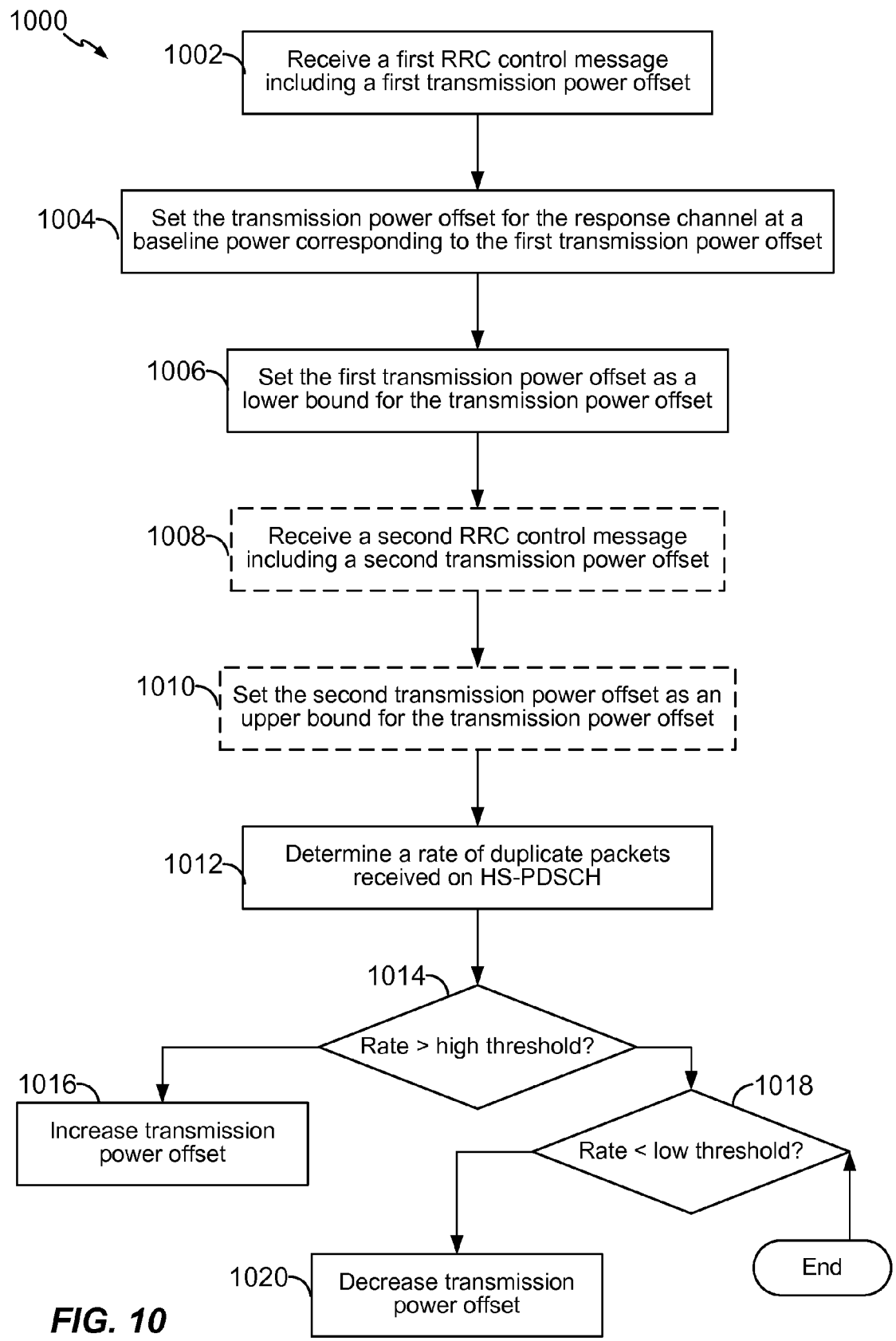

FIG. 10 illustrates additional details of an exemplary process for determining the power for transmitting the response channel, e.g., the HS-DPCCH, as in block 902, in accordance with some aspects of the present disclosure.

In block 1002, the UE may receive a first RRC control message that includes a first transmission power offset. For example, as described above, conventional RRC signaling may include one or more information elements corresponding to a transmission power offset. That is, conventional RRC signaling received at the UE 610 may include one or more of a CQI power offset DeltaCQI, a HARQ ACK power offset DeltaACK, and a HARQ NACK power offset DeltaNACK. In a conventional HSDPA system, as described above, these information elements may be utilized directly to set the transmission power offset for the response channel HS-DPCCH relative to the control channel DPCCH. However, in accordance with an aspect of the present disclosure, in block 1004, the received transmission power offset may be utilized to set a baseline level for the transmission power offset. That is, the transmission power offset to utilize for transmitting the response channel HS-DPCCH may initially be set in accordance with the received RRC signaling.

Further, in block 1006 the received first transmission power offset may be set as a lower bound for the transmission power offset. That is, in accordance with some aspects of the present disclosure, the received first transmission power offset may be considered by the UE 610 to be a minimum value for the transmission power offset, and any reductions to the value of the transmission power offset may be configured not to fall below the lower bound.

In some aspects of the present disclosure, in block 1008, the UE 610 may receive a second RRC control message including a second transmission power offset. That is, in this example, an additional information element, which may be provided on the same RRC control message as the first RRC control message or on a different message, may be transmitted to the UE 610. In block 1010, the UE may set the received second transmission power offset as an upper bound for the transmission power offset. In this case, any increase to the value of the transmission power offset may be configured not to rise above the upper bound.

In another aspect of the disclosure, the second RRC control message received in block 1008, and its utilization as the upper bound for the transmission power offset, may be optional. That is, some aspects of the present disclosure may rely only upon conventional RRC signaling, including the first RRC control message received in block 1002, without receiving an indication of an upper bound for the transmission power offset. In these examples, the upper bound may be a maximum power offset value preconfigured at the UE 610.

In block 1012, the UE may determine a rate of duplicate packets received on the downlink data channel HS-PDSCH. For example, the determination in block 1012 may be as described above with respect to process 950. In block 1014, the UE may determine whether the determined rate is greater than a first threshold. Here, the determination whether the determined rate is greater than a first threshold may additionally depend on whether the determined rate has remained above the first threshold for a time that is greater than a predetermined time. That is, in some aspects of the present disclosure, a brief interlude above the threshold may not necessarily bring about a change in the transmission power offset. Here, a suitable timer may be utilized to determine whether the duplicate packet rate has remained above the threshold for the corresponding time. If the process determines that the rate of duplicate transmissions determined in block 1012 is greater than the threshold, then in block 1016, the UE 610 may increase the transmission power offset. Here, the size of the increase may take any suitable value as determined in accordance with a particular implementation. Further, the increase may be dependent on whether the transmission power offset is already at or near the upper bound, and whether the increase would raise the transmission power offset above the upper bound. In this case, the increase may be reduced or eliminated.

If, on the other hand, in block 1018 the UE 610 determines that the duplicate transmission rate is less than a second, low threshold, then in block 1020 the UE 610 may decrease the transmission offset power. Again, in some aspects of the present disclosure, the determination whether the determined rate is less than the second threshold may depend on whether the determined rate has remained below the second threshold for a time that is greater than a predetermined time. That is, a brief interlude below the threshold may not necessarily bring about a change in the transmission power. Here, a suitable timer may be utilized to determine whether the duplicate packet rate has remained below the threshold for the corresponding time. Further, as above, the decrease taken in block 1020 may be dependent on whether the transmission power offset is already at or near the lower bound, and whether the decrease would lower the transmission power offset below the lower bound. In this case, the decrease may be reduced or eliminated.

In this fashion, the UE 610 may dynamically adjust the transmission power offset for the response channel HS-DPCCH based on the duplicate packet rate corresponding to packets received on the downlink data channel HS-PDSCH. In this way, a link imbalance brought about by coordinated power control between the serving HS-DSCH cell and a non-serving cell, which might otherwise cause a reduction in the reliability of the transmission of the response channel, may be reduced or avoided.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the features may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing features described herein, is considered a special purpose processor for carrying out such features. Similarly, a general-purpose computer is considered a special purpose computer when configured for carrying out features described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the features disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing features are merely examples and are not to be construed as limiting the invention. The description of the features is intended to be illustrative, and not to limit the scope of the claims. As such, the present teachings can be readily applied to other types of apparatuses and many alternatives, modifications, and variations will be apparent to those skilled in the art.

The invention claimed is:

1. A method of wireless communication operable at a user equipment, comprising:
   determining a rate of duplicate packets received on a downlink data channel, wherein the rate indicates a number of retransmissions of packets that are previously transmitted on the downlink data channel over a time period and acknowledged by the user equipment;
   determining a transmission power for transmitting an uplink response channel in accordance with the rate of duplicate packets received on the downlink data channel; and
   transmitting the uplink response channel utilizing the determined transmission power.

2. The method of claim 1, wherein the uplink response channel is configured to carry feedback information relating to the downlink data channel.

3. The method of claim 2, wherein the feedback information comprises at least one of a hybrid automatic repeat request (HARQ) acknowledgment message or downlink channel quality information.

4. The method of claim 1, wherein the determining of the rate of duplicate packets comprises:
   receiving a first packet on the downlink data channel;
   transmitting a hybrid automatic repeat request (HARQ) acknowledgment message corresponding to the first packet;
   receiving a second packet on the downlink data channel; and
   storing an indicator of a duplicate packet corresponding to a determination that the second packet is a retransmission of the first packet.

5. The method of claim 1, wherein the determining of the transmission power comprises:
   increasing a transmission power offset in accordance with the determined rate of duplicate packets being greater than a first threshold; and
   decreasing the transmission power offset in accordance with the determined rate of duplicate packets being less than a second threshold.

6. The method of claim 5,
   wherein the increasing of the transmission power offset further comprises determining that the determined rate of duplicate packets is greater than the first threshold for a time that is greater than a first predetermined time, and
   wherein the decreasing of the transmission power offset further comprises determining that the determined rate of duplicate packets is less than the second threshold for a time that is greater than a second predetermined time.

7. The method of claim 5, wherein the transmission power offset comprises a gain ratio for the response channel relative to an uplink control channel configured to carry control information relating to a dedicated data channel.

8. The method of claim 7, wherein the determining of the transmission power further comprises:
   receiving a first control message comprising a first transmission power offset,
   wherein first transmission power offset comprises a lower bound for the transmission power offset.

9. The method of claim 8, further comprising:
   receiving a second control message comprising a second transmission power offset,
   wherein the second transmission power offset comprises an upper bound for the transmission power offset.

10. The method of claim 9, wherein the first control message and the second control message each comprises radio resource control (RRC) signaling.

11. A user equipment configured for wireless communication, comprising:
    at least one processor;
    a memory coupled to the at least one processor;
    a transmitter coupled to the at least one processor for transmitting an uplink response channel and an uplink control channel; and
    a receiver coupled to the at least one processor for receiving a downlink data channel,
    wherein the at least one processor is configured to:
       determine a rate of duplicate packets received on the downlink data channel, wherein the rate indicates a number of retransmissions of packets that were previously transmitted on the downlink data channel over a time period and acknowledged by the user equipment;
       determine a transmission power for transmitting the uplink response channel in accordance with the rate of duplicate packets received on the downlink data channel; and transmit the uplink response channel utilizing the determined transmission power.

12. The user equipment of claim 11, wherein the uplink response channel is configured to carry feedback information relating to the downlink data channel.

13. The user equipment of claim 12, wherein the feedback information comprises at least one of a hybrid automatic repeat request (HARQ) acknowledgment message or downlink channel quality information.

14. The user equipment of claim 11, wherein the at least one processor, being configured to determine the rate of duplicate packets, is further configured to:
   receive a first packet on the downlink data channel;
   transmit a hybrid automatic repeat request (HARQ) acknowledgment message corresponding to the first packet;
   receive a second packet on the downlink data channel; and
   store, in the memory, an indicator of a duplicate packet corresponding to a determination that the second packet is a retransmission of the first packet.

15. The user equipment of claim 11, wherein the at least one processor, being configured to determine the transmission power, is further configured to:
   increase a transmission power offset in accordance with the determined rate of duplicate packets being greater than a first threshold; and
   decrease the transmission power offset in accordance with the determined rate of duplicate packets being less than a second threshold.

16. The user equipment of claim 15,
   wherein the increasing of the transmission power offset further comprises determining that the determined rate of duplicate packets is greater than the first threshold for a time that is greater than a first predetermined time, and
   wherein the decreasing of the transmission power offset further comprises determining that the determined rate of duplicate packets is less than the second threshold for a time that is greater than a second predetermined time.

17. The user equipment of claim 15, wherein the transmission power offset comprises a gain ratio for the response channel relative to the uplink control channel, wherein the uplink control channel is configured to carry control information relating to a dedicated data channel.

18. The user equipment of claim 17, wherein the at least one processor, being configured to determine the transmission power, is further configured to:
   receive a first control message comprising a first transmission power offset,
   wherein first transmission power offset comprises a lower bound for the transmission power offset.

19. The user equipment of claim 18, further comprising:
   receiving a second control message comprising a second transmission power offset,
   wherein the second transmission power offset comprises an upper bound for the transmission power offset.

20. The user equipment of claim 19, wherein the first control message and the second control message each comprises radio resource control (RRC) signaling.

* * * * *